(12) United States Patent
Singh et al.

(10) Patent No.: US 8,678,119 B2
(45) Date of Patent: Mar. 25, 2014

(54) TAMPERPROOF DEVICE FOR A COOLANT FILL CAP

(75) Inventors: Kulwinder Singh, Lake Orion, MI (US); Michael J. Montreuil, Macomb Township, MI (US); Jeffrey R. Tatrow, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 35 days.

(21) Appl. No.: 13/449,806

(22) Filed: Apr. 18, 2012

(65) Prior Publication Data

US 2013/0206489 A1 Aug. 15, 2013

Related U.S. Application Data

(60) Provisional application No. 61/598,001, filed on Feb. 13, 2012.

(51) Int. Cl.
*B60K 11/02* (2006.01)

(52) U.S. Cl.
USPC .................................... 180/68.4; 220/203.22

(58) Field of Classification Search
USPC .............. 180/68.4, 68.6; 220/203.22, 203.19, 220/214, 315, 319, 324
See application file for complete search history.

(56) References Cited

U.S. PATENT DOCUMENTS 3,102,660 A * 9/1963 Bowden ........................ 220/301
6,796,451 B2 * 9/2004 Harris ....................... 220/203.26

* cited by examiner

*Primary Examiner* — John Walters
(74) *Attorney, Agent, or Firm* — Quinn Law Group, PLLC

(57) ABSTRACT

A vehicle includes a body component, a rechargeable energy storage system (RESS), a traction motor, a coolant reservoir having an inlet, and a bracket. The traction motor is electrically connected to the RESS and delivers motor torque for propelling the vehicle. A lobed cap covers the inlet. The bracket extends between the lobed cap and the body component. The bracket defines an opening having radially-inward projecting tabs, each of which engages a different axial side wall of the cap between different adjacent lobes of the lobed cap to prevent rotation and removal of the lobed cap. A method includes providing the above bracket, routing a lobed cap of a coolant reservoir through the opening after installing the cap to the reservoir such that the tabs engage a different axial side wall of the cap between different adjacent lobes of the lobed cap.

13 Claims, 2 Drawing Sheets

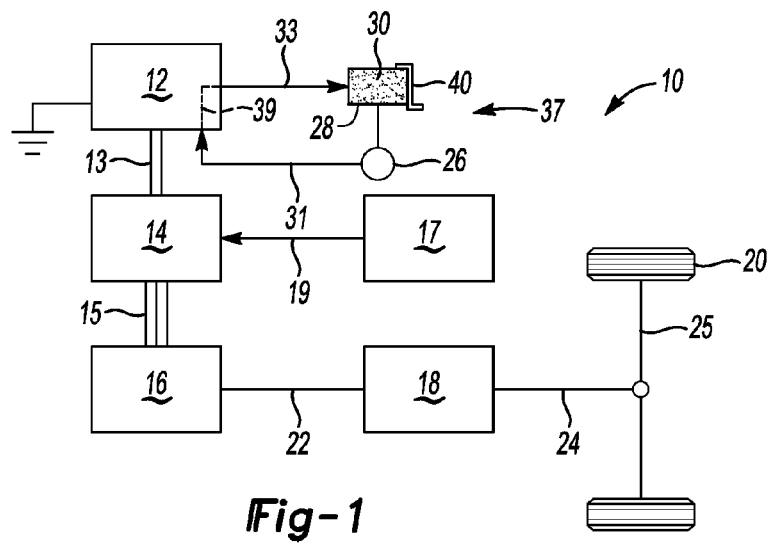
Fig-1
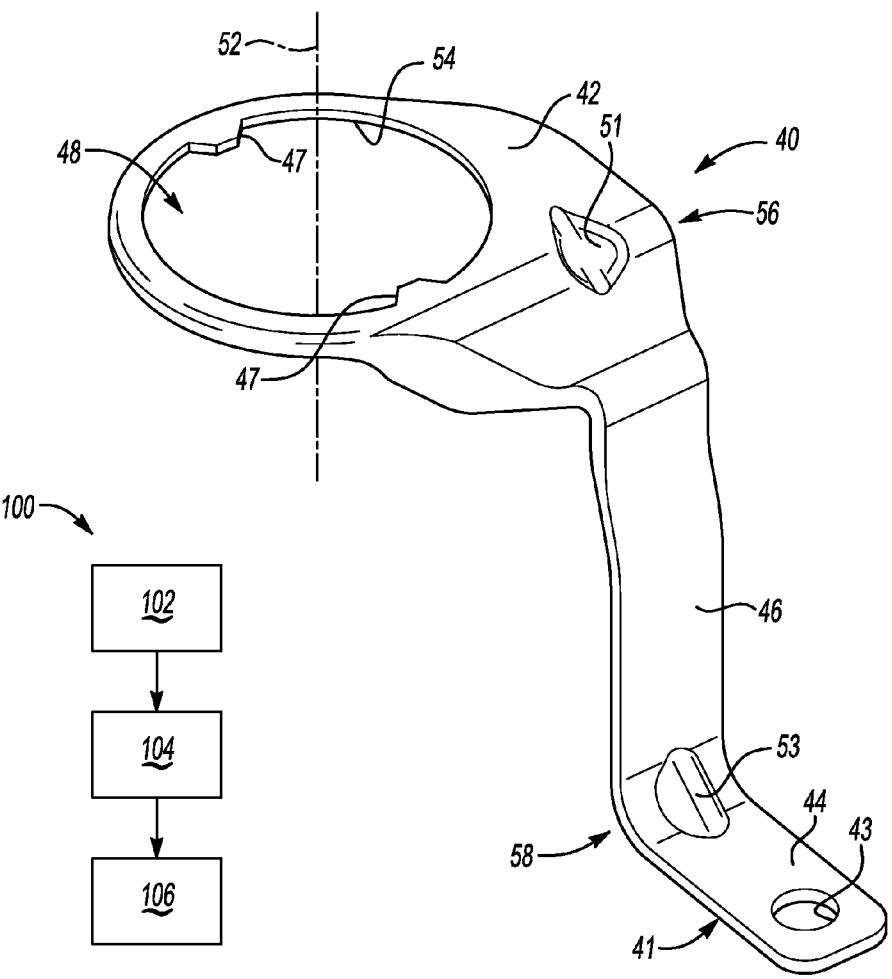
Fig-4
Fig-3

TAMPERPROOF DEVICE FOR A COOLANT FILL CAP

CROSS-REFERENCE TO RELATED APPLICATIONS

This application claims the benefit of U.S. Provisional Application No. 61/598,001 filed on Feb. 13, 2012, which is hereby incorporated by reference in its entirety.

TECHNICAL FIELD

The present disclosure relates to a tamperproof device for a coolant fill cap.

BACKGROUND

Vehicle systems typically use a pump to circulate coolant to various system components in order to regulate the temperature of those components. For instance, an internal combustion engine can generate a tremendous amount of heat during operation. Engine coolant is thus circulated in an engine cooling loop to remove any excess heat, some of which may be used to heat the passenger compartment.

Certain vehicle designs use an electric fraction motor, either alone or in conjunction with the engine, in order to propel the vehicle. The traction motor draws electricity from a rechargeable energy storage system (RESS). The fraction motor provides input torque to a transmission, and ultimately powers a set of drive wheels of the vehicle. In addition to the RESS, such vehicles may use various other high power electrical components, for instance a power inverter module and an onboard battery charger. The temperatures of these components, as with the engine in a conventional or hybrid electric vehicle, may be regulated via dedicated fluid cooling loops as noted above.

SUMMARY

A vehicle is disclosed herein that includes a body component, a rechargeable energy storage system (RESS), an electric traction motor, a coolant reservoir, and a bracket that restricts access to the coolant reservoir as set forth herein. The traction motor is electrically connected to the RESS and provides motor torque that propels the vehicle. The coolant reservoir contains a liquid coolant such as ethylene glycol. A coolant fill cap, referred to hereinafter as a lobed cap, closes an inlet to the coolant reservoir. The coolant reservoir is in fluid communication with the RESS. The bracket extends between the lobed cap and the body component, is fastened to the body component, and defines an opening having radially-inward projecting tabs. Each tab engages an axial surface of the lobed cap between different adjacent lobes to prevent rotation and removal of the cap. In this manner, access to the coolant reservoir is largely restricted to authorized service representatives having suitable tools for accessing and removing the bracket.

A battery coolant assembly is also disclosed herein for a vehicle having an RESS. The assembly includes a coolant reservoir that defines a fluid inlet and contains a liquid coolant. A lobed cap closes the inlet. The reservoir is in fluid communication with the RESS. A bracket extends between the cap and a body component of the vehicle. The bracket is fastened at one end to the body component. The bracket defines an opening having radially-inward projecting tabs, each of which engages a different axial side wall of the lobed cap between different adjacent lobes of the lobed cap. In this manner, rotation and removal of the lobed cap is largely prevented.

A method is also disclosed herein for limiting access to a coolant reservoir. The method includes providing a bracket with first, second, and third portions. The first portion defines an opening having radially-inward projecting tabs. The second portion connects the third portion to the first portion. The method includes routing a lobed cap of a coolant reservoir through the opening of the bracket's first portion after installing the lobed cap over an inlet of the reservoir, such that each of the tabs engages an axial surface of the cap between different adjacent lobes. The method also includes fastening the third portion to a body component of a vehicle to prevent rotation and removal of the lobed cap.

The above features and advantages and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

FIG. 1 is a schematic illustration of a vehicle having a battery cooling loop, access to which may be restricted via use of the present tamperproof device.

FIG. 3 is a schematic perspective view illustration of one embodiment of a bracket that is usable with the tamperproof device shown in FIG. 2.

FIG. 4 is a flow chart describing a method for using the tamperproof device shown in FIG. 2.

DETAILED DESCRIPTION

Figure 2:
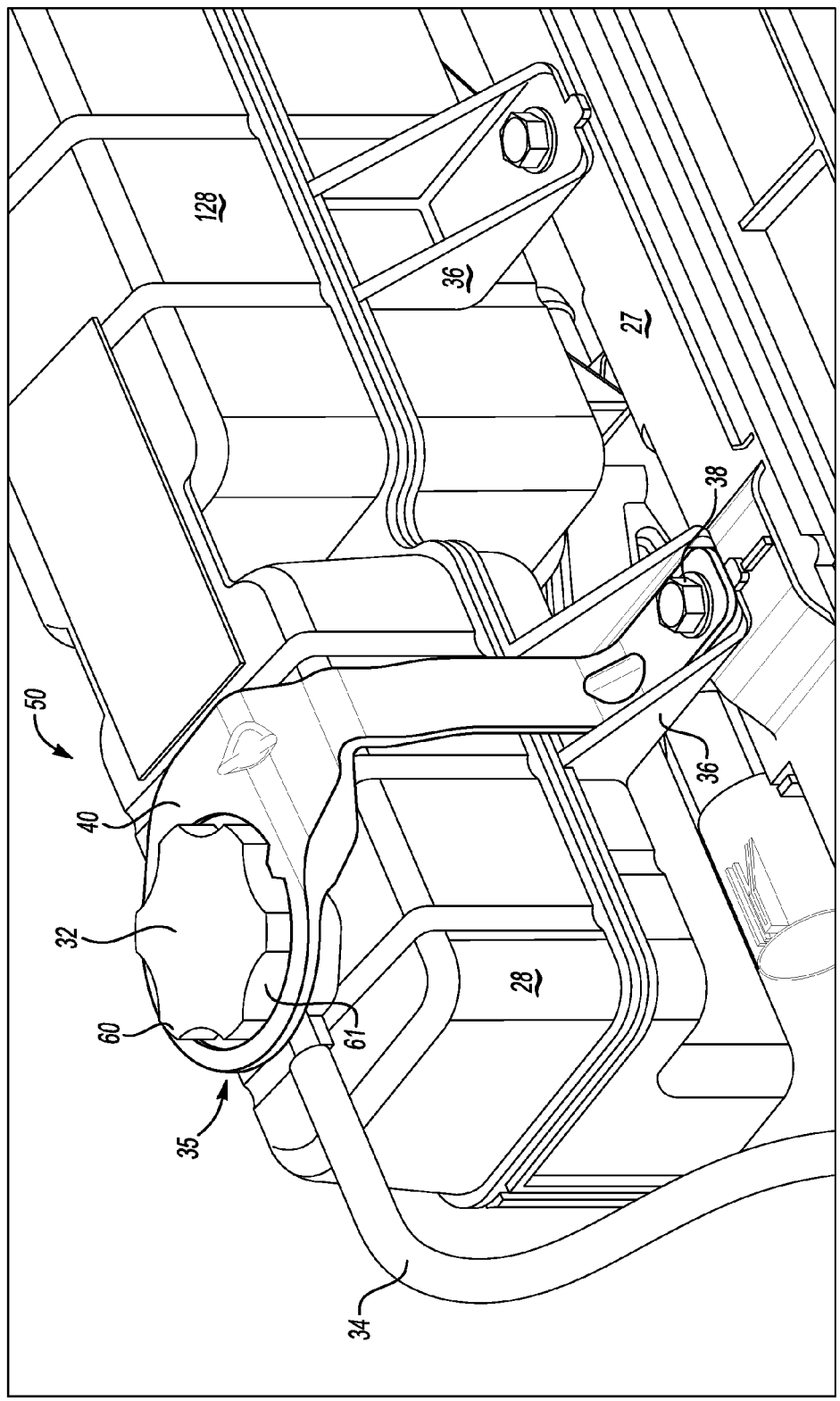
FIG. 2 is a schematic perspective view illustration of an example tamperproof device shown in an installed position with respect to an example coolant reservoir.

Referring to the drawings, wherein like reference numbers refer to like components throughout the several views, a vehicle 10 is shown schematically in FIG. 1. The vehicle 10 includes a high-voltage rechargeable energy storage system (RESS) 12 and an electric traction motor 16. The RESS 12 is cooled and heated as needed via a battery cooling loop 37 having a coolant reservoir 28 that contains a liquid coolant 30, e.g., ethylene glycol. Access to the coolant reservoir 28 is restricted using a bracket 40 as set forth hereinbelow with reference to FIGS. 2-4. In particular, an example battery coolant assembly 50 that uses such a bracket 40 is shown in FIG. 2. An example bracket 40 is shown in FIG. 3, while an example method for restricting access to the coolant reservoir 28 is shown in FIG. 4.

The traction motor 16 shown schematically in FIG. 1 may be configured as a multi-phase electric motor/generator unit. In such an embodiment, the traction motor 16 may be electrically connected to the RESS 12 via a traction power inverter module (TPIM) 14. The RESS 12 may be electrically connected to the TPIM 14 via a direct current (DC) bus 13. An alternating current (AC) bus 15 may be used to electrically connect the TPIM 14 to the fraction motor 16 as shown. While not shown in FIG. 1 for illustrative simplicity, the vehicle 10 may also include various controllers and an auxiliary power module (APM) for converting DC voltage to the different levels needed aboard the vehicle 10.

Output torque from the traction motor 16 may be delivered to a motor output shaft 22. The motor output shaft 22 may be connected to an input member (not shown) of a transmission 18 having an output member 24. The output member 24 ultimately transfers output torque from the transmission 18 to a drive axle 25 to rotate a set of drive wheels 20. The RESS 12, the TPIM 14, and the traction motor 16 in some modes may collectively provide an electric vehicle (EV) mode in which all input torque to the transmission 18 is generated by purely electric means, i.e., using electrical power from the RESS 12, as is well understood in the art. In other vehicle embodiments an internal combustion engine (not shown) may be used alone or in conjunction with the traction motor 16 to propel the vehicle 10 in certain operating modes.

In an extended-range electric vehicle embodiment, a small gasoline engine 17 may be used to generate additional electricity (arrow 19) as needed to extend the effective EV range of the vehicle 10. The electricity (arrow 19) may be transmitted to the TPIM 14 as shown, or it may be harnessed and used in any other manner suitable for recharging the RESS 12. Battery electric vehicle embodiments forego use of such an engine 17 altogether.

In any embodiment, i.e., hybrid, battery electric, or extended-range electric vehicle, substantial heat is generated over time by the operation of certain high-power electronic components, particularly the RESS 12, the TPIM 14, and the traction motor 16, as well as any other required circuitry, onboard battery chargers, relays, and other support equipment. The RESS 12 in particular may be cooled or heated via the battery cooling loop 37 as noted above.

The battery cooling loop 37 of FIG. 1 may include an auxiliary, e.g., 12 volt, coolant pump 26 that circulates some of the liquid coolant 30 drawn from the coolant reservoir 28 to the RESS 12. Fluid circulation is indicated in FIG. 1 by arrow 31. The RESS 12 defines a plurality of internal fluid passages 39, only one of which is shown for illustrative simplicity, that collectively permit the liquid coolant 30 to freely flow between adjacent battery cells (not shown) of the RESS 12, e.g., individual foil lithium ion battery cells. In this manner, the battery cells comprising the RESS 12 can be liquid cooled as needed. While not shown in FIG. 1, the battery cooling loop 37 may also include a heat exchanger, a 3-way flow control valve, a radiator, and other components necessary to selectively heat the liquid coolant 30 for warming the RESS 12, for instance on particularly cold days. Return flow (arrow 33) is provided back to the coolant reservoir 28.

Referring to FIG. 2, the coolant reservoir 28, a lobed cap 32, and the bracket 40 collectively form a battery coolant assembly 50. A second coolant reservoir 128 may be positioned adjacent to the coolant reservoir 28 in one embodiment, such as a power electronics coolant reservoir. The coolant reservoir 28 may be affixed to the front of a body component 27, for instance an under hood component such as a cross member, beam, or support member.

The coolant reservoir 28 contains the liquid coolant 30 of FIG. 1. The reservoir 28 defines a fluid inlet 35. The fluid inlet 35 is securely closed using a lobed cap 32. The lobed cap 32 may have six axial side walls 61 and six lobes 60 as shown, although fewer or more lobes 60 and side walls 61 may be used in other embodiments. The lobed cap 32 may be threaded male, with the fluid inlet 35 having mating female threads in the conventional manner such that the lobed cap 32, absent the bracket 40, may be readily tightened or loosened by respective clockwise and counterclockwise rotation of the lobed cap 32.

However, it is recognized herein that fluid overfill of the coolant reservoir 28 may be problematic at times depending on the nature of the liquid coolant 30 and the design of the RESS 12, both of which are shown in FIG. 1. Therefore, it may be desirable to limit end user access to the coolant reservoir 28. Because low coolant levels in the coolant reservoir 28 may indicate the presence of a fluid leak somewhere in the battery coolant loop 37 shown in FIG. 1, the bracket 40 of FIG. 2 can be used to ensure that the vehicle 10 of FIG. 1 is promptly taken to a maintenance facility for corrective action when coolant levels in the coolant reservoir 28 are low, rather than a user simply topping off coolant levels and delaying maintenance. Use of the bracket 40 as part of the assembly 50 of FIG. 2 helps to achieve these ends by preventing rotation, and thus removal, of the lobed cap 32 from the fluid inlet 35 as set forth below with reference to FIG. 3.

An overflow tube 34 may be positioned near the lobed cap 32 in fluid communication with the coolant reservoir 28 to divert overflow and prevent spills. The coolant reservoir 28 may include feet 36 that are secured to the body component 27 using a fastener 38. The fastener 38 may be a conventional fastener, e.g., a hex head bolt or lag bolt, or it may be a tamperproof fastener which may be engaged and removed only using a special mating tool. The former may be used where additional components are to be installed or stacked above the feet 36, such as tie bars, brackets, cross members, and the like, the position of which would effectively block access to the fastener 38. Absent such structure, a tamperproof fastener may be desirable.

Referring to FIG. 3, the bracket 40 of FIG. 2 may be constructed of a substantially rigid material such as corrosion resistant steel. The bracket 40 includes an upper/first portion 42, a lower/second portion 44, and a connecting/third portion 46. The first portion 42 defines an opening 48 at one end. A plurality of tabs 47 extend radially inward from a circumferential wall 54 defining the opening 48, i.e., radial with respect to a shared center axis 52 of the opening 48 and the lobed cap 32 of FIG. 2. The respective first and second portions 42 and 44 extend in opposite directions from, and opposite ends of, the third portion 46.

While only two tabs 47 are shown in FIG. 3, additional tabs 47 may be used without departing from the intended inventive scope. For instance, the example lobed cap 32 of FIG. 2 is shown with six lobes 60. With such a lobed cap 32, as many as six tabs 47 may be used, i.e., the number of tabs 47 may equal the number of lobes 60. As few as two tabs 47 may be used. However, a single tab 47 may be too easily defeated by bending of the first portion 42. Therefore, a simplified example embodiment of two tabs 47 is shown in FIGS. 2 and 3.

Regardless of the number of tabs 47 that are used, as shown in FIG. 2, each tab 47 engages a different wall 61 of the lobed cap 32 between adjacent lobes 60. Thus, the tabs 47 of FIG. 3 should extend a sufficient distance from the circumferential wall 54 to thereby engage/contact the wall 61 of the lobed cap 32 shown in FIG. 2 if rotation of the lobed cap 32 should be attempted while the bracket 40 is secured in place. That is, when the bracket 40 is properly installed, engagement of the lobed cap 32 of FIG. 2 by the tabs 47 of FIG. 3 prevents rotation and removal of the lobed cap 32, and thus effectively restricts access to the coolant reservoir 28.

The bracket 40 of FIG. 3 should be made as inflexible as possible to prevent removal of the bracket 40 by simply bending the first portion 42 around and over the lobed cap 32 shown in FIG. 2. Additionally, the bracket 40 may also include a feature 51 that is configured to minimize the amount of bending or flexing of the first portion 42 with respect to the third portion 46. For instance, a dart or crimp may be made as shown at or near an elbow 56 between the respective first and third portions 42 and 46. The presence of such a feature 51 at this particular location may help to increase the rigidity/decrease the flexibility of the elbow 56. This in turn may prevent a user from bending the upper portion 42 around the lobed cap 32 shown in FIG. 2 while the fastener 38 remains in place.

The second portion 44 of the bracket 40 forms a flat base with an underside 41. The second portion 44 also defines a mounting hole 43 through which the fastener 38 of FIG. 2 may be inserted. Similar to the feature 51, another feature 53 may be used to reinforce an elbow 58 defined between the second portion 44 and the third portion 46.

Referring to FIG. 2 in conjunction with FIG. 3, to install the bracket 40, the installed lobed cap 32 is simply routed through the opening 48 such that the tabs 47 engage different walls 61 of the lobed cap 32 between adjacent lobes 60. The third portion 46 will run alongside the coolant reservoir 28 of FIG. 2 in a generally vertical direction. The underside 41 of the second portion 44 rests against a surface of the foot 36 of the coolant reservoir 28. The fastener 38 then may be firmly threaded into the body component 27 once the second portion 44 is firmly seated on the foot 36 of the coolant reservoir 28. As noted above, additional underhood components may be positioned thereafter above the foot 36 to physically block access to the fastener 38.

Referring to FIG. 4, an example method 100 for tamper proofing a coolant reservoir in a vehicle, e.g., the coolant reservoir 28 shown in FIG. 1, commences with step 102. At step 102, a bracket 40 configured as shown in FIG. 3 is provided, i.e., having a first portion 42 that defines an opening 48 having a plurality of radially-inward projecting tabs 47, a second portion 44, and a third portion 46 connecting the first portion 42 to the second portion 44.

Step 104 includes routing a lobed cap of a coolant reservoir, such as the lobed cap 32 of the coolant reservoir 28 shown in FIG. 2, through the opening 48, after installing the lobed cap 32 to the coolant reservoir 28, such that each of the tabs 47 described in step 102 firmly engages an axial side wall 61 of the lobed cap 32 between different adjacent lobes 60 of the cap 32, as shown for example in FIG. 2.

Step 106 includes fastening the second portion 44 of the bracket 40 described in step 102 to a body component 27 of a vehicle such as the vehicle 10 of FIG. 1. For example, the second portion 44 of FIG. 2 may be fastened via a torque wrench or other means to the body component 27. Once secured, it becomes difficult to rotate and thus remove any lobed cap 32 that is engaged by the tabs 47 of the bracket 40. User access to the coolant reservoir 28 of FIG. 2 is thus restricted. Access to other reservoirs may be similarly restricted as will be readily appreciated by those of ordinary skill in the art, and therefore the present approach is not limited to use with the coolant reservoir 28 described above.

While the best modes for carrying out the present invention have been described in detail, those familiar with the art to which this invention relates will recognize various alternative designs and embodiments for practicing the invention within the scope of the appended claims.

The invention claimed is:

1. A vehicle comprising:
a body component;
a rechargeable energy storage system (RESS);
an electric traction motor that is electrically connected to the RESS, and that is configured to provide an output torque for propelling the vehicle using electrical energy from the RESS;
a coolant reservoir having a lobed cap, wherein the coolant reservoir is in fluid communication with the RESS; and
a bracket that extends between the lobed cap and the body component, and that is fastened at one end to the body component;
wherein the bracket defines an opening having a plurality of radially-inward projecting tabs, each of which engages a different axial side wall of the lobed cap between different adjacent lobes of the lobed cap to thereby prevent rotation and removal of the lobed cap from the coolant reservoir.

2. The vehicle of claim 1, wherein the bracket includes a first portion, a second portion, and a third portion that connects the first portion to the second portion, and wherein the second portion is securely fastened to the body component.

3. The vehicle of claim 2, wherein the first portion and the second portion extend in opposite directions with respect to each other from the third portion.

4. The vehicle of claim 1, wherein the plurality of tabs is at least two and no more than the number of lobes in the lobed cap.

5. The vehicle of claim 3, wherein the bracket includes a feature that minimizes bending between the first and third portions, and another feature that minimizes bending between the second and third portions.

6. A battery coolant assembly for a vehicle having a rechargeable energy storage system (RESS), the battery coolant assembly comprising:
a coolant reservoir;
a lobed cap for closing and opening the coolant reservoir, wherein the coolant reservoir is in fluid communication with the rechargeable energy storage system (RESS); and
a bracket that extends between the lobed cap and a body component of the vehicle, and that is fastened at one end to the body component;
wherein the bracket defines an opening having a plurality of radially-inward projecting tabs, each of which engages a different axial side wall of the lobed cap between different adjacent lobes of the lobed cap to thereby prevent rotation and removal of the lobed cap from the coolant reservoir.

7. The battery coolant assembly of claim 6, wherein the bracket includes a first portion, a second portion, and a third portion that connects the first portion to the second portion, and wherein the second portion is fastened to the body component.

8. The battery coolant assembly of claim 7, wherein the first portion and the second portion extend from the third portion in opposite directions.

9. The battery coolant assembly of claim 6, wherein the plurality of tabs is less than or equal to the number of lobes in the lobed cap.

10. The battery coolant assembly of claim 9, wherein the number of tabs is two and the number of lobes is six.

11. A method of restricting access to a coolant reservoir in a vehicle, the method comprising:
providing a bracket that defines an opening having a plurality of radially-inward projecting tabs;
routing a lobed cap through the opening after installing the cap onto a fluid inlet of the coolant reservoir, such that each of the tabs engages a different axial side wall of the lobed cap between different adjacent lobes of the lobed cap; and
fastening the bracket to a body component of the vehicle such that rotation and removal of the lobed cap is prevented.

12. The method of claim 11, wherein the bracket includes a first portion that defines the opening, a second portion, and a third portion that connects the first portion to the second portion, and wherein fastening the bracket to a body component includes fastening the second portion to the body component.

13. The method of claim 12, wherein fastening the second portion to the body component includes bolting the second portion to an underhood component of the vehicle.

* * * * *